United States Patent [19]

Oohashi et al.

[11] Patent Number: 5,024,688
[45] Date of Patent: Jun. 18, 1991

[54] METHOD FOR PRODUCING CARBON-COATED OPTICAL FIBER

[75] Inventors: Keiji Oohashi; Shinji Araki, both of Sakura; Hideo Suzuki, Funabashi; Tsuyoshi Shimomichi, Sakura, all of Japan

[73] Assignee: Fujikura Ltd., Tokyo, Japan

[21] Appl. No.: 423,308

[22] Filed: Oct. 18, 1989

[30] Foreign Application Priority Data

Nov. 30, 1988 [JP] Japan ............................... 63-303758
Dec. 13, 1988 [JP] Japan ............................... 63-314662

[51] Int. Cl.$^5$ ............................................. C03C 25/02
[52] U.S. Cl. ....................................... 65/3.12; 65/343; 65/60.6; 427/166; 427/249
[58] Field of Search ................. 65/3.1, 3.12, 3.3, 3.43, 65/18.2, 60.3, 60.6; 427/163, 166, 249; 350/96.33, 96.34; 501/37

[56] References Cited

U.S. PATENT DOCUMENTS

| | | | |
|---|---|---|---|
| 2,958,899 | 11/1960 | Stein et al. | |
| 4,183,621 | 1/1980 | Kao et al. | 350/96.3 |
| 4,402,993 | 9/1983 | Aisenberg et al. | 427/163 |
| 4,479,984 | 10/1984 | Levy et al. | 427/54.1 |
| 4,512,629 | 4/1985 | Hanson et al. | 350/96.3 |
| 4,518,628 | 5/1985 | Biswas et al. | 427/55 |
| 4,659,354 | 4/1987 | Roba | 65/3.12 |
| 4,735,856 | 4/1988 | Schultz et al. | 427/163 |
| 4,755,577 | 7/1988 | Suzuki | 350/96.34 |
| 4,787,703 | 11/1988 | Tomko et al. | 350/96.34 |
| 4,863,576 | 9/1989 | Collins et al. | 204/192.23 |
| 4,863,760 | 9/1989 | Schantz et al. | 65/60.8 |
| 4,867,775 | 9/1989 | Cain et al. | 65/3.43 |
| 4,874,222 | 10/1989 | Vacha et al. | 427/163 |

FOREIGN PATENT DOCUMENTS

| | | |
|---|---|---|
| 0308143 | 3/1989 | European Pat. Off. |
| 0353934 | 2/1990 | European Pat. Off. |
| 1646924 | 6/1970 | Fed. Rep. of Germany |
| 2493302 | 5/1982 | France |
| 58-184103 | 10/1983 | Japan |
| 59-83107 | 5/1984 | Japan |

OTHER PUBLICATIONS

Grant and Grant eds., Grant & Hackh's Chemical Dictionary 5th ed., McGraw-Hill Inc., 1987, pp. 274, 290.
Chaudhuri et al., Hermetic Coating on Optical Fibers, Proceeds of SPIE, vol. 717, Reliability Considerations, 25-26 Sep. 1986, pp. 27-32.
Lemaire et al., Hydrogen Permeation in Optical Fibers with Hermetic Carbon Coatings, Electronic Letters, 13 Oct. '88, vol. 24, #21, pp. 1323-1324.
Lu et al., Recent Developments in Hermetically Coated Optical Fiber, Journal of Lightwave Tech., vol. 6, #2, Feb. 1988, pp. 240-244.
Hackh's Chemical Dictionary, Third Edition, pp. 418-419.
Journal of Light Wave Technology, vol. 6, No. 2, Feb., 1988, pp. 240-244, N.Y., U.S.; K. E. Lu et al.: "Recent Developments in Hermetically Coated Optical Fiber".
Hydrogen Permeation in Optical Fibres with Hermetic Carbon Coatings, Electronics Letters, Oct. 13, 1988, vol. 24, No. 21, pp. 1323-1324.
Hermetically Coated Optical Fibers, Glaesemann, Kar, Corning Glass Works, International Wire & Cable Symposium Proceedings 1987, pp. 241 to 244.
Recent Developments in Hermetically Coated Optical Fiber, Glaesemann, Vandewoestine and Kar, Journal of Lightwave Technology, vol. 6, No. 2, Feb. 1988.
Amorphous Carbon Hermetically Coated Optical Fibers, Huff, DiMarcello, Hart, AT&T Bell Laboratories, OFC '88/Tuesday Afternoon/23.

*Primary Examiner*—Richard V. Fisher
*Assistant Examiner*—John J. Bruckner
*Attorney, Agent, or Firm*—Sprung Horn Kramer & Woods

[57] ABSTRACT

Disclosed is a method for producing carbon-coated optical fiber including the steps of thermally decomposing a halogenated hydrocarbon compound to obtain a thermal decomposate of the halogenated hydrocarbon, and depositing the thermal decomposate on a surface of an uncoated optical fiber to form at least one carbon coating layer on the surface of the fiber. The halogenated hydrocarbon compounds include $CClF_3$, $CCl_2F_2$, $CCl_3F$, $C_2Cl_2F$ and $C_2ClF_5$. The deposition is performed at a temperature which is slightly below the thermal decomposition temperature. The method includes an optional step of coating at least one resin layer over a surface of the carbon coating layer.

3 Claims, 1 Drawing Sheet

METHOD FOR PRODUCING CARBON-COATED OPTICAL FIBER

BACKGROUND OF THE INVENTION

1. Field of the Invention

The present invention relates to a method for producing optical fiber coated with a carbon layer.

2. Prior Art

Quartz-based optical fibers have been widely used for communications cables. Hydrogen coming into contact with these fibers disperses therein, and the molecular vibrations of the hydrogen lead to greater absorption losses. In addition, the hydrogen diffused therein may react with $P_2O_3$, $GeO_2$, or $B_2O_3$, which are contained in the fiber as dopants, and forming compounds with one or more OH groups. Absorption by the OH group also increases absorption losses. One way to solve these problems is to add a liquid-phase composition which can absorb hydrogen in the fiber (Japanese Patent Application kokai No. 61-251808). However, this method is impractical: the produced fiber has a limited capacity for hydrogen absorption and is structurally complex. Corning Glass (International Wire & Cable Symposium Proceedings 1987, pages 241–244, and Journal of Lightwave Technology, Vol. 6, No. 2, February 1988, pages 240–244) and AT&T (Electronic Letters, 13th Oct. 1988 Vol. 24, No. 21, pages 1323–1324, and OFC '88/Tuesday Afternoon/23) have recently disclosed that coating the fiber with carbon by chemical vapor deposition (CVD) can enhance its resistance to hydrogen. In the methods, an uncoated optical fiber prepared in a spinning furnace is led to a hot CVD furnace, and the hydrocarbon compounds are thermally decomposed to form a carbon layer on the surface of the uncoated optical fiber in the CVD furnace. In the hot CVD process, aqueous molecules absorbed on the surface of the uncoated fiber are however dispersed in the core of the uncoated optical fiber, and reacted with dopants which have been previously dispersed therein. Accordingly, transmission loss is greatly increased in the wavelength of 1.39 $\mu$m depending on the absorption of OH groups.

Also, aqueous molecules absorbed on the surface of the optical fiber is reacted with the optical fiber at high temperature in steps of forming carbon-coated layer on the surface of the optical fiber to form silanol groups. Also, hydrogen radicals, which are produced by thermally decomposing the original hydrocarbon compound, cut the siloxane bonds of composition of the optical fiber to form silanol groups. The silanol groups erode the surface of the optical fiber to lead to degrade mechanical properties thereof.

Furthermore, aqueous molecules absorbed on the surface of the optical fiber lead to degrade deposition rate for carbon coating.

SUMMARY OF THE INVENTION

Accordingly, it is an object of the present invention to provide a method for producing carbon-coated optical fiber having excellent hydrogen-resistance and mechanical properties.

According to an aspect of the present invention, there is provided a method for producing carbon-coated optical fiber comprising (a) thermally decomposing a halogenated hydrocarbon compound to obtain a thermal decomposate of the halogenated hydrocarbon, and (b) depositing the thermal decomposate on a surface of an uncoated optical fiber to form at least one carbon coating layer on the surface thereof.

DETAILED DESCRIPTION OF THE INVENTION

Halogenated hydrocarbons including ones which contain at least one chlorine atom in molecule thereof, and/or ones whose hydrogen atoms are totally substituted by halogen atoms can be used as starting materials for thermally decomposition.

Typical Examples of such halogenated hydrocarbons containing at least one chlorine atom include 1,2-dichloroethane, 1,1,1-trichloroethane, 1,1,2,2-tetrachloroethane, 1,2-dichloroethylene, monochlorobenzene, and the like.

Typical Examples of such halogenated hydrocarbons whose hydrogen atoms are totally substituted by halogen atoms include fluoride-containing halogenated hydrocarbons such as $CF_4$, $CClF_3$, $CCl_2F_2$, $CCl_3F$, $CBrF_3$, $C_2Cl_2F_4$, $C_2Br_2F_4$, $C_2ClF_5$, $C_2F_6$, and the like.

The above-described halogenated hydrocarbons are thermally decomposed to form chlorine radicals. The chlorine radicals react with hydrogen atoms of aqueous absorbed on the uncoated surfaces of the optical fiber to remove aqueous molecules from surfaces thereof. Accordingly, the mechanical properties of the carbon-coated optical fiber according to the present invention are improved because the formation of silanol groups are regulated by removing aqueous molecules to prevent the surfaces of the uncoated optical fibers from erosion during the carbon layer deposition process.

Furthermore, removing aqueous molecules from the surface of the optical fibers prevents aqueous molecules from diffusion from the surface of the optical fibers to core thereof. Accordingly, the transmission loss of the optical fibers caused by OH groups of aqueous, which absorb energy of a specific wavelength, e.g., 1.39 $\mu$m, is decreased because the formation of the OH groups is reduced by virtue of the remove of aqueous.

Also, all of halogen radicals generated by thermal decomposition of halogenated hydrocarbons have sufficiently chemical reactivities, and serve to remove compounds absorbed on the surface of the optical fibers and to clean up thereon. Accordingly, the deposition of the carbon coat is accelerated to increase the spinning rate of the optical fibers.

In particular, fluorine radicals having high chemical reactivities can remove fine flaws over the surface of the optical fibers by virtue of etching operation thereof during deposition of the carbon coat. In this case, mechanical strength of the optical fibers produced according to the present invention are improved.

The carbon coat formed on the surface of the optical fibers according to the present invention has properties of preventing hydrogen from penetration from the outer surface to the inner one thereof. Accordingly, high hydrogen-resistance of the optical fibers are improved by virtue of the carbon coat thereof.

BRIEF DESCRIPTION OF THE DRAWINGS

The present invention will now be illustrated with reference to the accompanying drawings wherein.

DESCRIPTION OF THE PREFERRED EMBODIMENTS

Figure 1:
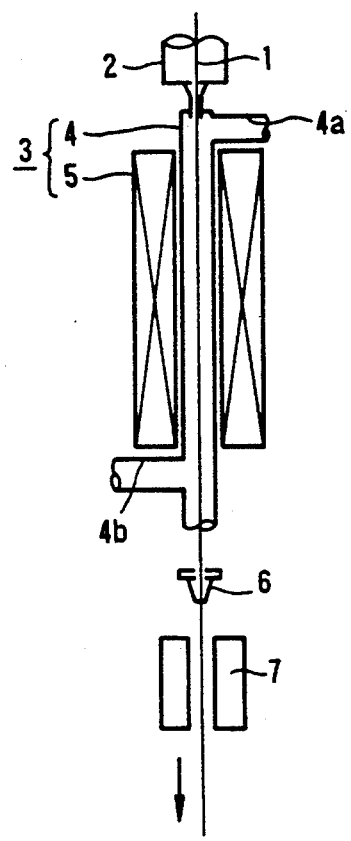
FIG. 1 is a perspective view showing an apparatus for producing the carbon-coated optical fiber which is preferably used in the method according to the present invention.

In FIG. 1, reference numeral 1 denotes an uncoated optical fiber which is produced by spinning a precursor (not shown) under heat in a spinning furnace denoted by reference numeral 2. The uncoated optical fiber 1 is then led to a hot CVD furnace 3, which is disposed beneath the spinning furnace 2, and is subjected to coating a carbon layer over the surface of the uncoated optical fiber 1 by CVD to form a carbon-coated optical fiber.

The furnace 3 comprises a reactor tube 4 having substantially cylindrical shape for performing and accelerating CVD reaction, and a heater 5 for heating the reactor tube 4 to regulate CVD reaction. The reactor tube 4 has an upper tube 4a for feeding a starting material for a carbon layer to the reactor tube 4, and a lower tube 4b for exhausting unreacted gasses to the ambient air. The heater 5 is disposed around the reactor tube 4 so as to cover the surface of the reactor tube 4 with a constant clearance between the reactor tube 4 and the heater 5. Typical Examples of the heater 5 include a resistance heater, induction heater, infrared heater and the like. Further, a type, which produces plasma by high frequency waves or microwaves to ionize and decompose the feed materials, may be used as the heater 5. Specifically, the heater 5 can be selected from the above described groups depending on a temperature region for heating the reactor tube 4 and for thermally decomposing the feed compounds fed to the reactor tube 4.

The optical fiber is fed to the hot CVD furnace at a predetermined rate so as to be passed on axes thereof. Simultaneously, the reactor tube 4 is heated by the heater 5 at a predetermined temperature, and the construction materials for carbon layer are fed through the upper tube 4a to the reactor tube 4.

As previously described, typical Examples of the feed compounds fed to the reactor tube 4 include halogenated hydrocarbon compounds containing at least one chlorine atom in molecule thereof, and ones whose hydrogen atoms are totally substituted by halogen atoms. In the formers, halogenated hydrocarbon compounds are preferably of 15 carbon atoms or less in molecule thereof in the views of the properties of the carbon layer over the uncoated optical fiber 1 and the carbon deposition rate. The latters are easily handled because they are incombustible and because decomposition temperature thereof are lower than that of the other.

The feed compounds may be fed in a gaseous state, or diluted with inert gases such as argon gas and the like. The feed rate is suitably determined depending on the type of the feed compounds and the inner temperature of the reactor tube 4, and generally in the range of from 0.2 to 1.0 l/min. The inner temperature of the reactor tube 4 is determined so as to be included in a thermal decomposition temperature region of the feed compounds, and generally in the range of from 500° to 1200° C., depending on the type of the feed compounds and the spinning rate. When the inner temperature is below 500° C., thermal decomposate of the feed compounds is not performed and accelerated. When the inner temperature is in excess of 1200° C., large quantities of soot is generated as a by-product, and simultaneously a structure of the obtained carbon layer becomes similar to graphite structure. In this case, the optical fiber having high hydrogen-resistance cannot be unfortunately obtained. In order to prevent soot from the formation thereof, the inner temperature of the reactor tube 4 may be kept so as to be slightly below the thermal decomposition temperature of the feed compounds. Specifically, the deposition is performed at a temperature which is slightly below the thermal decomposition temperature.

The uncoated optical fiber thus coated with the carbon layer is then led to a resin coating unit 6 for coating a resin layer over the surface of the carbon layer thereof and a setting unit 7 for setting the resin layer, these units 6 and 7 being continuously disposed at the lower portion of the hot CVD furnace 3 so as to be coaxial with the hot CVD furnace 3. Resins used as a material of the protective resin layer include ultraviolet-setting resins, thermosetting resins and the like. The setting methods used in the setting unit 7 are determined depending on the kinds of the resins. The resin layer formed over the carbon layer serves to protect the optical fiber and carbon layer thereof.

It is noted that although a single carbon layer is coated over the surface of the uncoated optical fiber in the above embodiment, plural carbon layers may be continuously coated over the uncoated optical fiber. Also, although a single resin layer is coated over the surface of the carbon layer, plural resin layers may be coated over the uncoated optical fiber.

EXAMPLE (Example 1)

A resistance furnace provided with a 40 mm i.d. quartz tube was disposed at the lower portion of a spinning furnace. Then, a 30 mm o.d., single-mode optical fiber presursor with a core impregnated with $GeO_2$ as a dopant was placed in the spinning furnace, and was spun at 20 mm/min into 125 $\mu$m o.d. optical fiber at 2000° C. 1,1,1-trichloroethane vapor as the feed compound, diluted with argon gas to about 5% by volume was then charged at about 3 l/min into the reactor tube which was heated and maintained at 1000° C. by the resistance furnace, thereby coating the uncoated optical fiber with a carbon-coating layer. The carbon coated optical fiber was then passed through urethane acrylate resin solution (Young's modulus: 50 kg/mm$^2$, elongation: 60%) sealed in a die pot to thereby coat the carbon-coated optical fiber with the ultraviolet-setting resin. The resin was then hardened by exposure to ultraviolet light. The final product had an o.d. of about 250 $\mu$m.

(Example 2)

The same procedure as described in Example 1 was repeated, except that monochlorobenzene diluted with argon gas to about 5% by volume was used as the feed compound charged to the reactor tube.

(Example 3)

The same procedure as described in Example 1 was repeated, except that 1,2-dichloroethane diluted with argon gas to 5% by volume was used as the feed compound charged to the reactor tube.

(Example 4)

The same procedure as described in Example 1 was repeated, except that 1,1,2,2-tetrachloroethane diluted with argon gas to 5% by volume was used as the feed compound charged to the reactor tube.

(Example 5)

The same procedure as described in Example 1 was repeated, except that 1,2-dichloroethylene diluted with argon gas to 5% by volume was used as the feed compound charged to the reactor tube.

(Comparative Example 1)

The same procedure as described in Example 1 was repeated, except that methane diluted with argon gas to 5% by volume was used as the feed compound charged to the reactor tube and it was decomposed at 1400° C.

(Comparative Example 2)

The same procedure as described in Example 1 was repeated, except that benzene diluted with argon gas to 5% by volume was used as the feed compound charged to the reactor tube.

(Comparative Example 3)

The same procedure as described in Example 1 was repeated, except that ethylene diluted with argon gas to 5% by volume was used as the feed compound charged to the reactor tube.

(Test Example 1)

Twenty fibers of each of the products prepared in Examples 1 through 5 and Comparative Examples 1 through 3 were subjected to tensile stress at a gauge length of 3 m and a strain rate of 10% per minute, and the fracture probability was plotted against tensile strength using a Weibull type plot to determine tensile strength at a fracture probability of 50%. The results are shown in Table 1.

(Test Example 2)

A 500 m long fiber of each of the products prepared in Examples 1 through 5 and Comparative Examples 1 through 3 was tested for its absorption loss at predetermined wavelengths by an apparatus for measuring absorption losses of optical materials at given wavelengths. Table 1 shows the loss at 1.39 μm for each of the fibers, at which wavelength absorption loss caused by the OH group occurs.

TABLE 1

| Sample | Fracture Strength ($F_{50}$) (kg) | Transmission Losses *1 (dB/km) |
| --- | --- | --- |
| Example 1 | 4.9 | 3.8 |
| Example 2 | 5.5 | 0.8 |
| Example 3 | 5.0 | 1.5 |
| Example 4 | 5.7 | 0.5 |
| Example 5 | 5.4 | 0.7 |
| Comparative Example 1 | 1.8 | 70 |
| Comparative Example 2 | 2.9 | 53 |
| Comparative Example 3 | 2.5 | 42 |

*1: Transmission losses measured at 2.39 μm.

As shown in Table 1, the optical fibers of Examples 1 through 5 have a higher mechanical strength and lower absorption loss than the others. It has been thus confirmed that the method of the present invention produces mechanically stronger and more hydrogen resistant optical fibers.

(Example 6)

A resistance furnace was set up underneath a spinning furnace for spinning an optical fiber material into an uncoated optical fiber. Then, a 30 mm o.d., single-mode optical fiber material with a core impregnated with $GeO_2$ as a dopant was played in the spinning furnace, where it was spun at 60 m/min into 125 μm o.d., single-mode optical fiber at 2000° C. 1,2-dichloro-1,2-difluoroethylene vapor as the feed compound, diluted with argon gas to about 5% by volume was then charged at about 3 l/min into the reaction tube which was heated by the resistance furnace and maintained at 1000° C., thereby coating the uncoated optical fiber with a carbon-coating layer. The carbon-coating optical fiber was then passed through urethane acrylate resin solution (Young's modulus: 70 kg/mm², elongation: 60%) sealed in a die pot, thereby coating the carbon-coated optical fiber with the ultraviolet-setting resin. The resin was then hardened by exposure to ultraviolet light. The final product had an o.d. of about 300 μm.

(Example 7)

The same procedure as described in Example 6 was repeated, except that 1,2-dichloro-1,1,2,2-difluoroethane was used as the feed compound charged to the reactor tube.

(Example 8)

The same procedure as described in Example 6 was repeated, except that 1-chloro-1,2,2-trifluoroethylene was used as the feed compound charged to the reactor tube and it was decomposed at 800° C.

(Example 9)

The same procedure as described in Example 6 was repeated, except that dichlorodifluoromethane was used as the feed compound, and it was decomposed at 1200° C. and the optical fiber material was spun at 90 m/min.

(Example 10)

The same procedure as described in Example 6 was repeated, except that trichlorofluoromethane was used as the feed compound charged to the reactor tube.

(Comparative Example 4)

The same procedure as described in Example 6 was repeated, except that benzene was used as the feed compound charged to the reactor tube.

(Comparative Example 5)

The same procedure as described in Example 6 was repeated, except that benzene was used as the feed compound charged to the reactor tube and the optical fiber material was spun at 10 m/min.

(Comparative Example 6)

The same procedure as described in Example 6 was repeated, except that 1,2-dichloroethane was used as the feed compound charged to the reactor tube and the optical fiber material was spun at 20 m/min.

(Comparative Example 7)

The same procedure as described in Example 6 was repeated, except that chlorodifluoromethane was used as the feed compound charged to the reactor tube and the optical fiber material was spun at 30 m/min.

(Test Example 3)

The same procedure as described in Test Example 1 was repeated for 20 fibers of each of the products prepared in Examples 6 through 10 and Comparative Examples 4 through 7, and fracture probability was plotted against tensile strength in a Weibull type plot to determine tensile strength at a fracture probability of 50%. In addition, the thickness of the carbon-coating layer deposited on each of the optical fibers was determined by a scanning electron microscope. The results are shown in Table 2.

TABLE 2

| Sample | Fracture Strength (kg) | Carbon-Coating Layer Thickness (Å) |
| --- | --- | --- |
| Example 6 | 6.0 | 1000 |
| Example 7 | 5.8 | 900 |
| Example 8 | 6.1 | 500 |
| Example 9 | 5.6 | 500 |
| Example 10 | 5.9 | 1100 |
| Comparative Example 4 | 3.5 | Essentially None |
| Comparative Example 5 | 1.5 | 900 |
| Comparative Example 6 | 3.9 | 500 |
| Comparative Example 7 | 3.9 | 600 |

As shown in Table 1, the optical fibers of Examples 6 through 10 produced by the method of the present invention have higher mechanical strength and a carbon-coating layer thick enough to prevent penetration of hydrogen into the fiber body.

Further, each of the fibers produced in Examples 6 through 10 was allowed to stand in a hydrogen atmosphere. Transmission loss both before and after the hydrogen exposure was measured. This test confirmed that each fiber has good hydrogen resistance properties because no difference in transmission loss was observed before and after the test.

(Test Example 3)

Figure 2:
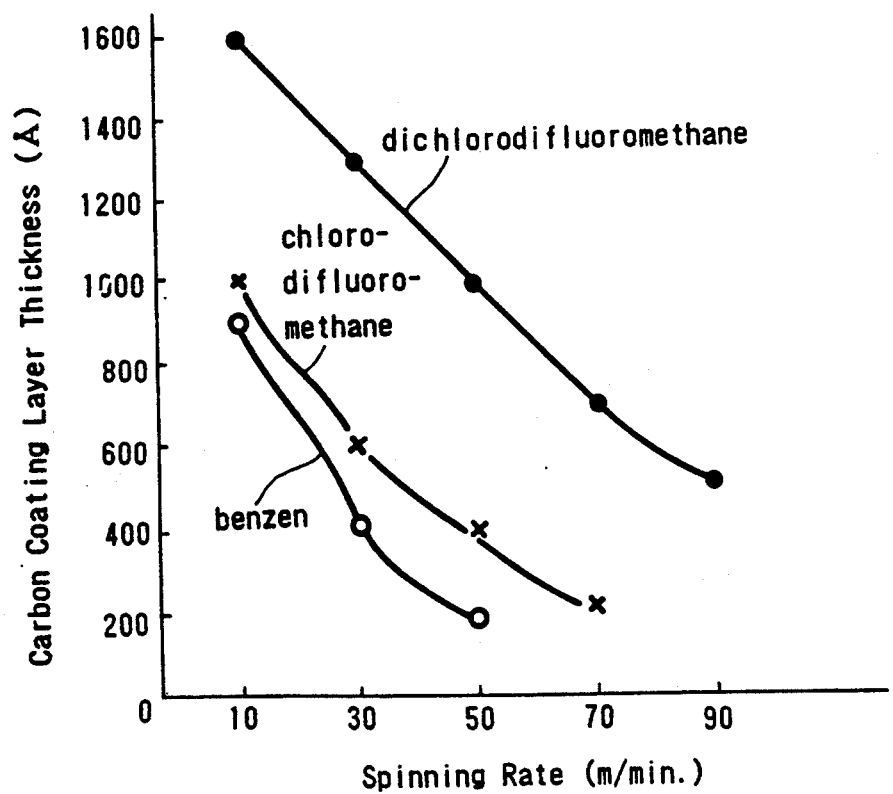
FIG. 2 is a diagram shownwing the relationship between the spinning rate of the optical fiber and the carbon coat thickness when various starting compounds are used.

The same procedure described in Example 6 was repeated, except that each of benzene, chlorodifluoromethane and dichlorodifluoromethane was used as the feed compound charged to the reactor tube, and it was decomposed at 1200° C., and the optical fiber material was spun at 10, 30, 50, 70 and 90 m/min. Thickness of the carbon-coating layer was determined by a scanning electron microscope. The results for the respective samples appear in FIG. 2.

As shown here, use of a halogenated hydrocarbon compound whose hydrogen atoms were totally replaced by halogen atoms as the feed compound charged to the reactor tube accelerated the deposition of the carbon-coating layer, with the result that a carbon-coating layer of a sufficient thickness to prevent penetration of hydrogen was produced at an increased spinning rate.

We claim:

1. A method for producing carbon-coated optical fiber, the method comprising
   (a) providing an uncoated non electrically conductive optical glass fiber to be coated with at least one carbon coating layer on the surface;
   (b) thermally decomposing a halogenated hydrocarbon compound, wherein said halogenated hydrocarbon compound is at least one compound selected from the group consisting of $CClF_3$, $CCl_2F_2$, $CCl_3FC_2Cl_2F_4$ and $C_2ClF_5$, to obtain carbon as a thermal decomposition product of said halogenated hydrocarbon; and
   (c) depositing said carbon as said thermal decomposition product on the surface of the uncoated optical fiber to form a protective coating thereon.

2. A method for producing carbon-coated optical fiber as claimed in claim 1, further comprising
   (d) coating the surface of said carbon coating layer with at least one resin layer.

3. A method for producing carbon-coated optical fiber as claimed in claim 2, wherein said resin layer is made of a material which is selected from the group consisting of ultraviolet-setting resins and thermosetting resins.

* * * * *

UNITED STATES PATENT AND TRADEMARK OFFICE
CERTIFICATE OF CORRECTION

PATENT NO. : 5,024,688

DATED : June 18, 1991

INVENTOR(S) : Oohashi et al.

It is certified that error appears in the above-identified patent and that said Letters Patent is hereby corrected as shown below:

Title Page     ABSTRACT: Line 9 delete " $C_2Cl_2F$ " and substitute -- $C_2Cl_2F_4$ --

Signed and Sealed this

Twenty-fifth Day of October, 1994

Attest:

BRUCE LEHMAN

Attesting Officer     *Commissioner of Patents and Trademarks*